United States Patent
Kubota et al.

(10) Patent No.: US 11,530,490 B2
(45) Date of Patent: Dec. 20, 2022

(54) TERMINAL MATERIAL WITH SILVER COATING FILM AND TERMINAL WITH SILVER COATING FILM

(71) Applicant: MITSUBISHI MATERIALS CORPORATION, Tokyo (JP)

(72) Inventors: Kenji Kubota, Naka (JP); Tooru Nishimura, Naka (JP); Takashi Tamagawa, Naka (JP); Kiyotaka Nakaya, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 298 days.

(21) Appl. No.: 16/636,056

(22) PCT Filed: Aug. 8, 2018

(86) PCT No.: PCT/JP2018/029780
§ 371 (c)(1),
(2) Date: Feb. 3, 2020

(87) PCT Pub. No.: WO2019/031549
PCT Pub. Date: Feb. 14, 2019

(65) Prior Publication Data
US 2021/0158990 A1   May 27, 2021

(30) Foreign Application Priority Data

Aug. 8, 2017  (JP) .............................. JP2017-153624
Jun. 28, 2018  (JP) .............................. JP2018-123097

(51) Int. Cl.
*H01B 1/02*   (2006.01)
*B32B 15/01*  (2006.01)
(Continued)

(52) U.S. Cl.
CPC .............. *C25D 5/505* (2013.01); *B32B 15/01* (2013.01); *C25D 3/12* (2013.01); *C25D 3/30* (2013.01);
(Continued)

(58) Field of Classification Search
None
See application file for complete search history.

(56) References Cited

U.S. PATENT DOCUMENTS

2002/0185716 A1    12/2002  Abys et al.
2002/0192492 A1*   12/2002  Abys ....................... C23C 26/00
                                                                    428/647
(Continued)

FOREIGN PATENT DOCUMENTS

CN    101681728 A    3/2010
CN    103029369 A    4/2013
(Continued)

OTHER PUBLICATIONS

Supplementary European Search Report dated Apr. 1, 2021, issued for European Patent Application No. 18844721.3.
(Continued)

*Primary Examiner* — Xiaobei Wang
(74) *Attorney, Agent, or Firm* — Locke Lord LLP

(57) ABSTRACT

In a terminal material with a silver coating film including a silver layer on a surface, a terminal and a terminal material having high reliability are easily manufactured with low cost without a heat treatment. A base material formed of copper or a copper alloy; and nickel layer, an intermediate layer, and a silver layer laminated on the base material in this order are included, the nickel layer has a thickness of 0.05 μm to 5.00 μm and is formed of nickel or a nickel alloy, the intermediate layer has a thickness of 0.02 μm to 1.00 μm and is an alloy layer containing silver (Ag) and a substance X, and the substance X includes one or more kinds of tin, bismuth, gallium, indium, and germanium.

12 Claims, 4 Drawing Sheets

(51) Int. Cl.
  *H01R 13/03* (2006.01)
  *C25D 5/50* (2006.01)
  *C25D 5/00* (2006.01)
  *C25D 3/12* (2006.01)
  *C25D 3/30* (2006.01)
  *C25D 3/46* (2006.01)
  *C25D 3/56* (2006.01)
  *C25D 5/12* (2006.01)
  *C25D 5/34* (2006.01)
  *C25D 7/00* (2006.01)

(52) U.S. Cl.
  CPC .............. *C25D 3/46* (2013.01); *C25D 3/562* (2013.01); *C25D 5/12* (2013.01); *C25D 5/34* (2013.01); *C25D 5/617* (2020.08); *C25D 5/619* (2020.08); *C25D 7/00* (2013.01); *H01B 1/02* (2013.01); *H01B 1/026* (2013.01); *H01R 13/03* (2013.01); *Y10T 428/1291* (2015.01); *Y10T 428/12896* (2015.01); *Y10T 428/12944* (2015.01)

(56) References Cited

U.S. PATENT DOCUMENTS

| 2010/0186993 A1* | 7/2010 | Yamaguchi | H01R 13/03 |
| | | | 174/126.2 |
| 2013/0196174 A1* | 8/2013 | Zhang-Beglinger | C22C 9/04 |
| | | | 428/647 |
| 2016/0172069 A1 | 6/2016 | Sumiya et al. | |
| 2016/0265127 A1 | 9/2016 | Sadamori et al. | |
| 2016/0273120 A1 | 9/2016 | Shinohara et al. | |

FOREIGN PATENT DOCUMENTS

| EP | 1256981 A1 | 11/2002 |
| EP | 2551382 A1 | 1/2013 |
| JP | S58-221291 A | 12/1983 |
| JP | 2001-3194 A | 1/2001 |
| JP | 2003-3292 A | 1/2003 |
| JP | 2008-169408 A | 7/2008 |
| JP | 2008-270192 A | 11/2008 |
| JP | 2014-181354 A | 9/2014 |
| JP | 2015-110833 A | 6/2015 |
| JP | 2015-137421 A | 7/2015 |
| JP | 2015-165483 A | 9/2015 |
| WO | 2010/005088 A1 | 1/2010 |
| WO | 2014/199837 A1 | 12/2014 |
| WO | 18/077874 A1 | 5/2018 |

OTHER PUBLICATIONS

International Search Report dated Sep. 11, 2018, issued for PCT/JP2018/029780.

Office Action dated Aug. 4, 2021, issued for Chinese Patent Application No. 201880051456.7.

Office Action dated Feb. 16, 2022, issued for Japanese Patent Application No. 2018-123097 and English translation thereof.

\* cited by examiner ns with regard to a substance. The invention will first of all be described with reference to what one normally thinks of as the prior art. The prior art is described on the following pages.

TERMINAL MATERIAL WITH SILVER COATING FILM AND TERMINAL WITH SILVER COATING FILM

BACKGROUND OF THE INVENTION

Technical Field

The present invention relates to a copper terminal material with a silver coating film and a terminal manufactured with the copper terminal material.

Priority is claimed on Japanese Patent Application No. 2017-153624, filed on Aug. 8, 2017 and Japanese Patent Application No. 2018-123097, filed on Jun. 28, 2018, the content of which is incorporated herein by reference.

Background Art

As a terminal for a connector used for connection of electric wirings of vehicles or consumer products, terminal materials obtained by plating of tin, gold, or silver on a surface of a copper or copper alloy base material are generally used. Among these, the terminal materials obtained by plating of noble metal such as gold or silver are suitable to be used in a high temperature environment due to excellent heat resistance.

In the related art, the following Patent Documents disclose such terminal materials obtained by plating of noble metal.

Patent Document 1 discloses a terminal material in which a silver plating layer having a two-layer structure formed of a first silver plating layer which is a lower layer side as a base material side, and a second silver plating layer which is an upper layer side which is formed on the first silver plating layer and exposed to a surface of a silver plating terminal is formed on a surface of a base material formed of copper or a copper alloy, and discloses that insertion and extraction of terminals are performed well and wear resistance is excellent by preventing diffusion of copper to the surface.

Patent Document 2 discloses the producing of a silver plating material capable of preventing an increase in contact resistance while maintaining a high hardness. Patent Document 2 discloses that this silver plating material is produced by forming a surface layer formed of silver on a material by performing electroplating in a silver plating solution including 80 to 110 g/L of silver, 70 to 160 g/L of potassium cyanide, and 55 to 70 mg/L of selenium at a solution temperature of 12° C. to 24° C., a current density of 3 to 8 A/dm$^2$, and with a product of a concentration of potassium cyanide in the silver plating solution and the current density in a range of equal to or less than 840 g·A/L·dm$^2$, a preferentially oriented surface of the surface layer is a {111} plane, and a ratio of a half-price width of an X-ray diffraction peak of the {111} plane after heating at 50° C. for 168 hours to a half-price width of an X-ray diffraction peak of the {111} plane before the heating is equal to or more than 0.5.

Patent Document 3 discloses a silver plating material in which a base layer formed of nickel is formed on a material formed of copper or a copper alloy and a surface layer formed of silver having a thickness equal to or less than 10 μm is formed on the surface of this base layer. Patent Document 3 discloses that, in this silver plating material, a thickness of the base layer is set to be equal to or less than 2 μm and preferably equal to or less than 1.5 μm, an area fraction of a {200} azimuth of the surface layer is equal to or more than 15% and preferably equal to or more than 25%, and bending workability is excellent.

Patent Document 4 discloses a noble metal coating material for an electric contact. Patent Document 4 discloses that, in this noble metal coating material, base layers which are one or more layers of nickel, cobalt, zinc, copper, and the like, having an average crystal particle diameter equal to or more than 0.3 μm are formed between a conductive metal base body and a noble metal layer, high long-term reliability is realized by preventing diffusion of a base body component in a high temperature environment.

Patent Document 5 discloses a heat-resistant and corrosion-resistant silver plating material having high heat resistance formed of an intermediate layer of an alloy plating containing 0.05 to 20 wt % of phosphorus and a balance of nickel and inevitable impurities or nickel, cobalt, and inevitable impurities, with respect to a base material of a metal material, and a silver or silver alloy plating surface layer.

CITATION LIST

Patent Literature

[Patent Document 1] Japanese Unexamined Patent Application, First Publication No. 2008-169408
[Patent Document 2] Japanese Unexamined Patent Application, First Publication No. 2015-110833
[Patent Document 3] Japanese Unexamined Patent Application, First Publication No. 2014-181354
[Patent Document 4] Japanese Unexamined Patent Application, First Publication No. 2015-137421
[Patent Document 5] Japanese Unexamined Patent Application, First Publication No. 2001-3194

SUMMARY OF INVENTION

Technical Problem

In the inventions disclosed in Patent Documents 1 to 3, the terminal properties such as contact resistance are improved by optimizing a structure of a silver plating layer, but a manufacturing method becomes complicated due to necessity to perform plating twice or a strictly limited composition of a silver plating bath.

In the invention disclosed in Patent Document 4, reliability of a noble metal contact is improved by increasing the crystal particle diameter of the base plating, but a heat treatment is necessary due to an increase in size of the base plating layer, accordingly, a structure of a copper alloy also increases, and accordingly, desired material properties may not be obtained.

In the invention disclosed in Patent Document 5, a nickel alloy plating coating film which is an alloy plating intermediate layer becomes fine crystals and the copper may be diffused to a silver surface through a crystal grain boundary. Accordingly, in a case where a film thickness is not great, heat resistance is insufficient, in a case of being exposed to a high temperature such as 200° C. In addition, phosphorus in the nickel alloy plating layer is diffused to the silver surface by thermal load and contact reliability may be deteriorated. Further, in a case where the thickness of nickel or nickel alloy plating layer is great, die wear during the pressing may be increased. Since the nickel alloy plating layer has poor toughness, in a case where it is thickened, cracks are easily generated during the pressing. Therefore, it is desired that the thickness of the nickel alloy plating layer or the like is as thin as possible.

The present invention is made in consideration of these circumstances and an object thereof is to manufacture a terminal and a terminal material having high reliability, in a terminal material with a silver coating film including a silver layer on a surface with low cost.

Solution to Problem

According to the present invention, there is provided a terminal material with a silver coating film, including: a base material formed of copper or a copper alloy; and a nickel layer, an intermediate layer, and a silver layer laminated on the base material in this order, in which the nickel layer has a thickness of 0.05 µm to 5.00 µm and is formed of nickel (Ni) or a nickel alloy, the intermediate layer has a thickness of 0.02 µm to 1.00 µm and is an alloy layer containing silver (Ag) and a substance X, and the substance X includes one or more kinds of tin (Sn), bismuth (Bi), gallium (Ga), indium (In), and germanium (Ge).

In this terminal material with a silver coating film, the nickel layer prevents diffusion of copper from the base material to improve heat resistance and the silver layer has excellent heat resistance. The intermediate layer is an alloy layer containing silver and the substance X, the substance X is easily alloyed with any of nickel of the nickel layer and silver of the silver layer. Accordingly, an effect of increasing adhesiveness between each layer to prevent formation of a nickel oxide layer increasing a contact resistance due to oxidation of a nickel surface due to diffused oxygen on the silver layer after the heating, and preventing separation between the nickel layer and the silver layer are obtained. However, in a case where the thickness of the intermediate layer is less than 0.02 µm, the effect of increasing adhesiveness is not sufficient, and in a case where the thickness thereof exceeds 1.00 µm, cracks are generated during the bending.

In a case where the thickness of the nickel layer is less than 0.05 µm, the diffusion of copper may not be prevented due to generation of a pinhole in the film, and the heat resistance may be deteriorated, and in a case where the thickness thereof exceeds 5.00 µm, cracks may be generated during the bending.

A nickel component is diffused to the intermediate layer from the nickel layer, and accordingly, a portion of the intermediate layer on the nickel layer side may contain some nickel.

In the embodiment of the terminal material with a silver coating film of the present invention, the intermediate layer may have a two-layer structure of a first layer containing the substance X as a main component and a second layer containing silver as a main component.

It is possible to improve adhesiveness between the nickel layer and the silver layer by the first layer containing the substance X as a main component. In addition, it is possible to prevent formation of a nickel oxide by inhibiting the oxygen diffusion in the silver layer by the second layer containing silver as a main component and to prevent an increase in resistance during the heating.

In the embodiment of the terminal material with a silver coating film of the present invention, the nickel layer may contain any one or more of phosphorus (P), boron (B), tungsten (W), sulfur (S), zinc (Zn), and tin (Sn) in a total content of 1 at % to 40 at %.

In the terminal material with a silver coating film, the heat resistance obtained by the silver layer is held by a diffusion prevention effect of copper in the nickel layer from the base material, and in a case where the diffusion prevention effect is deteriorated, copper is diffused to the surface of the silver layer and copper oxide may be formed to deteriorate the heat resistance.

The nickel layer contains any one or more of phosphorus, boron, tungsten, sulfur, zinc, and tin in a total content of 1 at % to 40 at %, and accordingly, the diffusion prevention effect is high. These additive elements are concentrated in a crystal grain boundary of nickel and prevents the diffusion of copper from the base material through a nickel grain boundary. In a case where a total content of phosphorus, boron, tungsten, sulfur, zinc, and tin is less than 1 at %, the effect of preventing the diffusion of copper from the base material is not sufficient, and in a case where the total content thereof exceeds 40 at %, the coating film becomes brittle and cracks during working are easily generated.

In the embodiment of the terminal material with a silver coating film of the present invention, the nickel layer may have a structure containing an amorphous material.

In a part of the amorphous material in the nickel layer, a diffusion path of copper is reduced due to loss of the crystal grain boundary, and accordingly, it is possible to further prevent the diffusion of copper.

It is preferable that the entire nickel layer is made amorphous, but even in a case where an amorphous material and a crystalline material are mixed, it is possible to prevent the diffusion of copper.

According to the present invention, there is provided a terminal with a silver coating film formed of the terminal material with a silver coating film.

Advantageous Effects of Invention

According to the present invention, the nickel layer is provided on the base material, and accordingly, it is possible to effectively exhibit heat resistance of the silver layer by preventing the diffusion of copper from the base material. The intermediate layer described above is interposed between the nickel layer and the silver layer, and accordingly, it is possible to maintain high adhesiveness between the nickel layer and the silver layer and maintain excellent heat resistance. In this case, it is possible to provide a terminal material having high reliability.

DESCRIPTION OF EMBODIMENTS

Hereinafter, embodiments of the present invention will be described.

Figure 1:
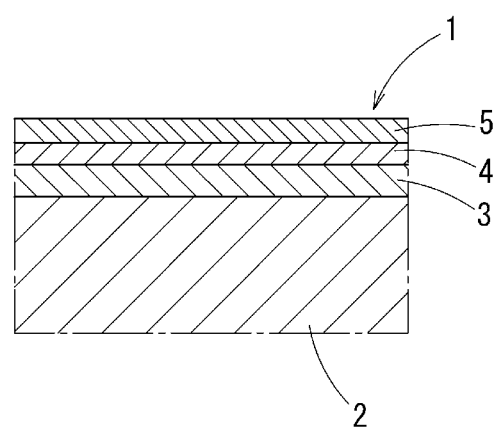
FIG. 1 It is a schematic cross-sectional view of a surface portion of a terminal material of one embodiment of the present invention.

As shown in FIG. 1, a terminal material 1 with a silver coating film of the present invention includes a base material 2 formed of a copper (Cu) or copper alloy plate, a nickel layer 3 formed of nickel (Ni) or a nickel alloy formed on a surface of the base material 2, an intermediate layer 4 containing silver (Ag) and a substance X formed on the nickel layer 3, and a silver layer 5 formed of silver (Ag) or a silver alloy formed on the intermediate layer 4.

A configuration of the base material 2 is not particularly limited, as long as it is formed of copper or a copper alloy, and an affected layer of the surface may be removed.

The nickel layer 3 may be configured with any of pure nickel or a nickel alloy and is preferably formed of an alloy containing any one or more of phosphorus (P), boron (B), tungsten (W), sulfur (S), zinc (Zn), and tin (Sn) in nickel. By causing nickel to contain any one or more of phosphorus, boron, tungsten, sulfur, zinc, and tin, an effect of preventing the diffusion of copper from the base material 2 is obtained and heat resistance is increased. A content of any one or more of phosphorus, boron, tungsten, sulfur, zinc, and tin may be 1 at % to 40 at % and a thickness thereof may be 0.05 µm to 5.00 µm.

The nickel layer 3 has a structure containing an amorphous material. In a part of the amorphous material in the nickel layer 3, a diffusion path of copper is reduced due to loss of the crystal grain boundary, and accordingly, it is possible to further prevent the diffusion of copper. It is preferable that the entire nickel layer 3 is amorphized, but even in a case where an amorphous material and a crystalline material are mixed, it is possible to prevent the diffusion of copper.

The intermediate layer 4 is an alloy layer containing silver and a substance X. The substance X contains one or more kinds of tin (Sn), bismuth (Bi), gallium (Ga), indium (In), and germanium (Ge). These elements are easily alloyed with any of nickel of the nickel layer 3 and silver of the silver layer 5, and accordingly, it is possible to increase adhesiveness between each layer to prevent separation between the nickel layer 3 and the silver layer 5. In addition, an effect of preventing formation of a resistance layer (increase in resistance) due to oxidation of the surface of nickel in a case of heating to prevent an increase in resistance is obtained.

For example, the intermediate layer 4 has a two-layer structure of a first layer containing the substance X as a main component and a second layer containing Ag as a main component. It is possible to improve adhesiveness between the nickel layer 3 and the silver layer 5 by the first layer positioned on the nickel layer 3 side, and it is possible to prevent formation of a nickel oxide by inhibiting the oxygen diffusion in the silver layer 5 by the second layer positioned on the silver layer 5 side and to prevent an increase in resistance during the heating. The intermediate layer 4 may have a single layer structure. A nickel component is diffused to the intermediate layer 4 from the nickel layer 3, and accordingly, a portion (first layer) of the intermediate layer 4 on the nickel layer 3 side may contain some nickel.

However, in a case where a thickness of the intermediate layer 4 is less than 0.02 µm, an effect of increasing adhesiveness is not sufficient, and in a case where the thickness thereof exceeds 1.00 µm, cracks are generated during the bending.

The silver layer 5 has an effect of increasing heat resistance of the terminal material 1 and a thickness thereof is preferably 0.5 µm to 2.0 µm.

Next, a manufacturing method of this terminal material 1 will be described.

A copper or copper alloy plate is prepared as the base material 2, a surface of which is cleaned and etched with a chemical polishing solution to remove an affected layer of the surface, and a crystal surface of the base material 2 is exposed from the surface.

Next, each plating layer (nickel layer 3, intermediate layer 4, and silver layer 5) is laminated on the surface of the base material 2 obtained by adjusting the surface as described above, by electroplating.

In order to form the nickel layer 3, a general nickel plating bath, that is, a Watts bath containing nickel sulfate ($NiSO_4$) and boric acid ($H_3BO_3$) as main components or a sulfamate bath containing nickel sulfamate ($Ni(NH_2SO_3)_2$) and boric acid ($H_3BO_3$) as main components is used. In a case of forming a nickel phosphorus alloy plating layer, phosphorus acid is added to a nickel plating bath. A temperature of the bath is suitably 40° C. to 55° C. and a current density is suitably 1 $A/dm^2$ to 40 $A/dm^2$. In this case, a suitable amount of an alloyed component such as phosphorus acid, dimethylamine borane, or tungstate (for example, 20 g/L to 40 g/L of phosphorus acid) is added to the nickel plating bath. Accordingly, the amorphization of the nickel layer 3 is achieved and the nickel layer 3 has a structure containing an amorphous material.

As a plating bath for forming a pure nickel plating layer as the nickel layer 3, the Watts bath or sulfamate bath is used.

In a case where the intermediate layer 4 is, for example, an alloy layer containing silver and tin (in a case where the substance X is Sn), the intermediate layer is formed by performing tin plating on the nickel plating layer formed in advance, and then performing silver plating for forming the silver layer 5. In this case, the mutual diffusion of nickel, tin, and silver occurs between these plating layers, and accordingly, the intermediate layer 4 contains silver, tin, and nickel. The mutual diffusion slowly proceeds by standing still at room temperature (5° C. to 35° C.) or higher for 24 hours or longer, but may forcibly proceed by a heating treatment at 100° C. to 150° C. for 10 to 60 minutes.

In this case, tin plating or tin alloy plating for forming a tin plating layer can be performed by a well-known method, for example, an organic acid bath (for example, a phenolsulfonic acid bath, an alkanesulfonic acid bath, or an alkanolsulfonic acid bath), an acidic bath (a fluoroboric acid bath, a halogen bath, a sulfuric acid bath, or a pyrophosphate bath), or an alkaline bath (a potassium bath or a sodium bath). A temperature of the bath is suitably 15° C. to 35° C. and a current density is suitably 1 $A/dm^2$ to 10 $A/dm^2$.

A thickness of the tin plating layer formed in this step is preferably 0.02 µm to 1.1 µm. In a case where the thickness thereof is excessively small, the thickness of the intermediate layer is insufficient, and in a case where the thickness thereof is excessively great, tin may excessively corrode nickel and the nickel layer 3 may be defective.

In a case where the substance X configuring the intermediate layer 4 is bismuth, a bismuth layer is formed on the nickel plating layer. A thickness of this bismuth layer is preferably 0.02 µm to 1.1 µm.

In a case where the substance X configuring the intermediate layer 4 is gallium, a gallium layer is formed on the nickel plating layer. A thickness of this gallium layer is preferably 0.02 µm to 1.1 µm.

In a case where the substance X configuring the intermediate layer 4 is indium, an indium layer is formed on the nickel plating layer. A thickness of this indium layer is preferably 0.02 µm to 1.1 µm.

In a case where the substance X configuring the intermediate layer 4 is germanium, a germanium layer is formed on the nickel plating layer. A thickness of this germanium layer is preferably 0.02 µm to 1.1 µm.

As a plating bath for forming the silver layer 5, silver cyanide plating bath which is a general silver plating bath may be used. A temperature of the bath is suitably 15° C. to 35° C. and a current density is suitably 0.1 A/dm$^2$ to 3 A/dm$^2$. In this case, before the silver plating, silver strike plating may be performed in order to further increase adhesiveness.

The terminal material 1 manufactured as described above is processed in a shape of a terminal and used. The terminal material is exposed to a high temperature environment in a connector of wirings in vehicles or the like, but the nickel layer 3 functions as a barrier layer, and accordingly, excellent heat resistance is obtained, it is possible to effectively prevent the diffusion of copper from the base material 2, and to stably maintain excellent properties such as high heat resistance and low contact resistance of the silver layer 5. These effect are particularly effective in a case where the nickel layer 3 contains any one or more of phosphorus, boron, tungsten, sulfur, zinc, and tin, and in a part of the amorphous material in the nickel layer 3, a diffusion path of copper is reduced due to loss of the crystal grain boundary, and accordingly, the diffusion prevention effect is high.

Since the intermediate layer 4 formed of an alloy containing silver and a substance X is provided between the nickel layer 3 and the silver layer 5, it is possible to increase adhesiveness between each layer and prevent separation between the nickel layer 3 and the silver layer 5. In addition, the diffusion of oxygen to the nickel layer 5 from the silver layer 3 in a case of heating can be prevented by the intermediate layer 4, and accordingly, it is possible to prevent the formation of a resistance layer due to oxidation of a surface of nickel.

Further, in a case where the intermediate layer 4 has a two-layer structure of a first layer and a second layer, it is possible to further increase adhesiveness between the nickel layer 3 and the silver layer 5 to more effectively prevent the separation between these, and prevent the formation of a nickel oxide due to inhibition of the oxygen diffusion in the silver layer 5 to prevent an increase in resistance during the heating.

It is also possible to manufacture the terminal material by a simple method such as plating by adjusting the surface of the base material 2 by an etching treatment and to manufacture the terminal material with low cost.

EXAMPLES

Samples 1 to 15 having different components of each layer were manufactured and configurations, components, properties, and the like thereof were compared to each other. In all of the samples 1 to 15, a Cu—Zn-based alloy ("MNEX" (registered product) manufactured by Mitsubishi Shindoh Co., Ltd.) was used as a base material, etching was performed with a chemical polishing solution of a composition of 100 g/L of sulfuric acid, 30 g/L of hydrogen peroxide, 10 mg/L of chloride ion, 2 mL/L of 1-propanol for 20 seconds, and a copper surface was cleaned to adjust the surface.

After that, a nickel plating layer or a nickel alloy plating layer was formed. For example, in the sample 4, a film of nickel phosphorus alloy plating was formed on the base material 2 with a thickness of 0.1 µm by using a nickel plating bath of 240 g/L of nickel sulfate hexahydrate, 35 g/L of nickel chloride, 30 g/L of boric acid, and 10 g/L of phosphorus acid, pH=2.6. In the same manner as each other sample, the nickel plating layer or the nickel alloy plating layer was manufactured by varying components by adding a suitable amount (50 g/L) of alloyed components (phosphorus acid (samples 4, 10, 11, and 15), dimethylamine borane (sample 9), and tungstate (sample 8)), etc., into the nickel plating bath.

Regarding the intermediate layer, for example, in the sample 4, a film of tin plating was formed to have 0.05 µm using a methanesulfonic acid bath, the silver strike plating and the silver plating were sequentially performed using a cyan bath, a silver layer having a thickness of 1 µm was formed, and a terminal material including an intermediate layer containing tin was obtained. In the sample 3, a film of indium plating was formed using a plating bath formed of indium (III) amidosulfate, amidosulfuric acid, sodium amidosulfate, and sodium chloride, the silver layer was formed in the same manner as in the sample 4, and a terminal material including an intermediate layer containing indium was obtained. In the sample 8, a film of gallium plating was formed using a plating bath formed of gallium (III) chloride and sodium sulfate, the silver layer was formed in the same manner as in the sample 4, and a terminal material including an intermediate layer containing gallium was obtained. Regarding each of other samples, the silver plating was performed after the formation of the plating layer containing the substance X, and a terminal material including an intermediate layer was obtained.

Regarding the samples 1 to 15 manufactured as described above, a thin film piece of an observation sample (terminal material 1) was manufactured by a focused ion beam processing device and a cross section observation of a plating/base material interface was performed using a Spherical aberration correction Scanning Transmission Electron Microscope (Cs-STEM) (Titan G2 ChemiSTEM manufactured by Thermo Fisher Scientific) as analysis of the nickel layer. The observation was performed at a magnification of 2500 to 80000 and element distribution of the plating/base material interface was confirmed by line analysis by STEM-EDS.

In Table 1, the symbol of the element in a bracket shown with the content of alloy component in the nickel layer shows a component included in the nickel layer. For example, the nickel layer 3 of the samples No. 1 to 3 is formed with nickel (Ni) without containing an alloy component, and the nickel layer 3 of the sample No. 4 is formed with a nickel alloy (Ni—P alloy) containing 2 at % of phosphorus (P).

Regarding the presence of an amorphous phase, a case where an area of an amorphous structure observed in a visual field of 500 nm$^2$ is 10% or more was determined as "present", and a case where an area of an amorphous structure observed is less than 10% was determined as "none".

The thickness of each plating layer was measured with an X-ray fluorescent film thickness meter before the plating layer coated thereon is formed. In Table 1, the symbol of the element in a bracket shown with the thickness of the intermediate layer corresponds to the substance X described above. For example, in the sample No. 1, it is found that, the intermediate layer is formed of an alloy containing silver and bismuth and a thickness thereof is 1.00 µm.

Figure 2:
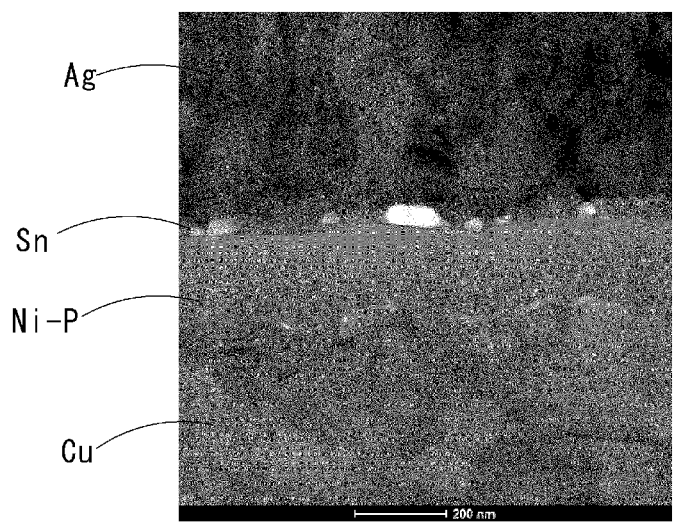
FIG. 2 It is a TEM image of a copper terminal material in which an intermediate layer containing a first layer having a concentration of tin of approximately 60 at % and a second layer having a concentration of tin of approximately 20 at % is formed.

The determination whether or not the intermediate layer has a single layer structure or a two-layer structure was performed with a concentration profile of the substance X in the STEM-EDS. For example, in a terminal material shown in FIG. 2, an intermediate layer having a two-layer structure containing a layer (first layer) of a substance X main body having a concentration of the substance X (tin) of approximately 60 at % and a layer (second layer) of a silver main body having a concentration of the substance X of approximately 20 at %.

The contact resistance after the heating, the plating separation between the nickel layer 3 and the silver layer 5, and the bending workability were evaluated with respect to each sample.

The contact resistance was measured by manufacturing a sample having a semi-spherical protrusion having a radius of 1.0 mm and a flat plate sample, performing heating at 200° C. for 500 hours, and bringing both samples into contact with each other. Specifically, the semi-spherical protrusion was brought into contact with the flat plate sample using a compression tester containing a load cell, the measurement of contact resistance between the flat plate sample and the sample including the semi-spherical protrusion was started in this state, a contact load applied between both samples was slowly increased, and the contact resistance, in a case where the load has reached a load 2N was measured using a four—terminal method. A current value in this case was 10 mA.

The plating separation between the nickel layer 3 and the silver layer 5 was observed using a cross section of the semi-spherical protrusion with an SEM by heating the sample processed to have a semi-spherical protrusion having a radius of 1.0 mm at 200° C. for 500 hours, and the separation between the silver layer 5 and the nickel layer 3 was determined. In a case where a gap having a width of 0.1 μm or more is present on the interface between silver and nickel with a length of 0.5 μm or more, it was determined that the separation occurred.

In the evaluation of bending workability, a bending test was performed based on a test method (item 4) of JCBA (Japan Copper And Brass Association) T307. That is, a plurality of test pieces having a width of 10 mm a length of 30 mm were collected from a bar for properties evaluation so that an axis of bending is in a direction orthogonal to a rolling direction, various surface treatments (cleaning, plating, and the like) were performed as described above using this test piece as the base material 2, and a W bending test was performed with a load of 9.8×103 N using a W-shaped jig having a bending angle of 90 degrees and a bending radius of 0.5 mm.

After that, the bent portion was observed with a stereoscopic microscope and the bending workability was evaluated. A level where a clear crack was not observed on the bent portion after the bending test was evaluated as excellent "A", a level where a fine crack was partially generated on the plating surface but the exposure of a copper alloy base material (base material 2) was not observed was evaluated as good "B", a level where the exposure of the copper alloy base material was not observed but a crack greater than that in the level evaluated as good "B" was generated was evaluated as pass "C", and a level where the copper alloy base material (base material 2) was exposed due to a generated crack was evaluated as fail "D". None of the samples 1 to 15 had the evaluation level of C regarding the bending workability.

The results of these are shown in Table 1.

TABLE 1

| | Ni or Ni alloy plating layer (nickel layer) | | | Intermediate layer | | Contact resistance | Ag—Ni | |
|---|---|---|---|---|---|---|---|---|
| Sample No. | Alloy component content (at %) | Thickness (μm) | Presence of amorphous phase | Layer structure | Thickness (μm) | after heating (mΩ) | plating separation | Bending workability |
| 1 | 0(Ni) | 0.05 | None | Single layer | 1.00(Bi) | 3.0 | None | A |
| 2 | 0(Ni) | 5.00 | None | Single layer | 0.02(Ge) | 2.9 | None | B |
| 3 | 0(Ni) | 0.10 | None | Two layer | 0.20(In) | 2.3 | None | B |
| 4 | 2(Ni—P) | 0.20 | None | Two layer | 0.05(Sn) | 1.9 | None | A |
| 5 | 10(Ni—Zn) | 0.50 | None | Two layer | 0.03(Sn) | 1.7 | None | A |
| 6 | 1(Ni—S) | 2.00 | None | Two layer | 0.20(Bi) | 1.8 | None | A |
| 7 | 30(Ni—Sn) | 3.00 | None | Two layer | 0.08(Sn) | 1.6 | None | A |
| 8 | 40(Ni—W) | 1.00 | None | Two layer | 0.50(Ga) | 1.8 | None | A |
| 9 | 18(Ni—B) | 0.10 | Present | Two layer | 0.10(Bi) | 1.0 | None | A |
| 10 | 10(Ni—P) | 0.30 | Present | Two layer | 0.15(Sn) | 1.2 | None | A |
| 11 | 15(Ni—P) | 0.15 | Present | Two layer | 0.04(Sn) | 0.7 | None | A |
| 12 | 0(Ni) | 1.00 | None | — | — | 8.5 | Occurred | B |
| 13 | 0(Ni) | 0.03 | None | Single layer | 1.20(Sn) | 11.0 | None | D |
| 14 | 0(Ni) | 5.50 | None | Single layer | 0.01(Sn) | 7.5 | Occurred | D |
| 15 | 15(Ni—P) | 0.12 | Present | — | — | 4.5 | Occurred | D |

As clearly shown from the results, it is thought that, in the terminal materials of the samples No. 1 to 11 including the intermediate layer formed of an alloy containing silver and the substance X (one or more kinds of tin, bismuth, gallium, indium, and germanium) and having a thickness of 0.02 μm to 1.00 μm, the contact resistance after the heating is small, the separation between the nickel layer and the silver layer is not observed, and the diffusion of copper is prevented. In addition, it is found that the bending workability is excellent. Among these, the samples No. 4 to 11 including the intermediate layer, and in the nickel layer, containing any one or more of phosphorus, boron, tungsten, sulfur, zinc, and tin in a total content of 1 at % to 40 at %, particularly had low contact resistance which was good.

Figure 3:
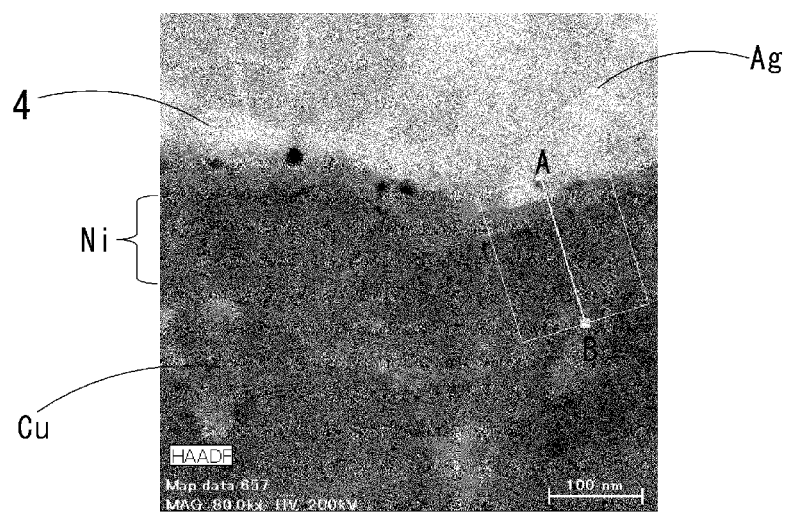
FIG. 3 It is a TEM image showing a cross section of a sample No. 4.
Figure 4:
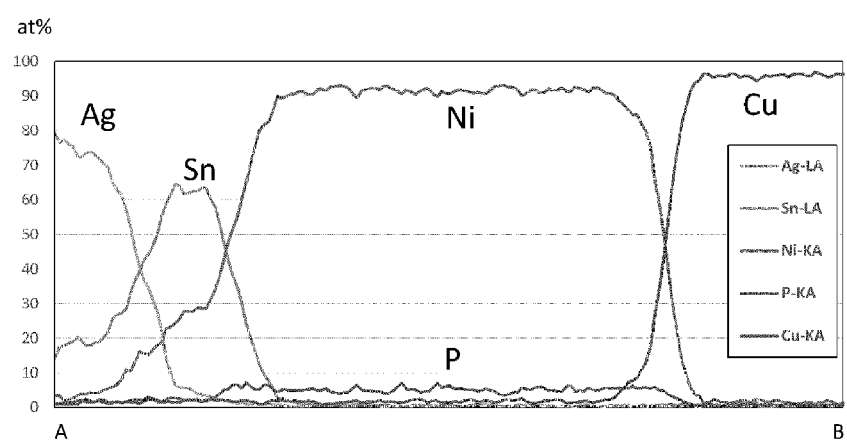
FIG. 4 It is a view showing an EDS measurement result of an end surface of the sample No. 4 shown in FIG. 3.

FIG. 3 is a TEM image showing a cross section of the sample No. 4 and FIG. 4 is an EDS measurement result of an end surface of the sample No. 4. Each component in A-B line of the TEM image of FIG. 3 is shown in the EDS measurement result of FIG. 4, a left end is an A point and a right end is a B point.

As shown in FIGS. 3 and 4, in the sample No. 4, the intermediate layer containing silver (Ag) and tin (Sn) is formed, a layer (first layer) of a tin main body is positioned on the nickel layer side, and tin is also diffused to the silver layer side, and a Ag—Sn alloy layer (second layer) of a silver main body is formed. A large amount of the Ni component diffused from the nickel layer are particularly present in the first layer.

Figure 5:
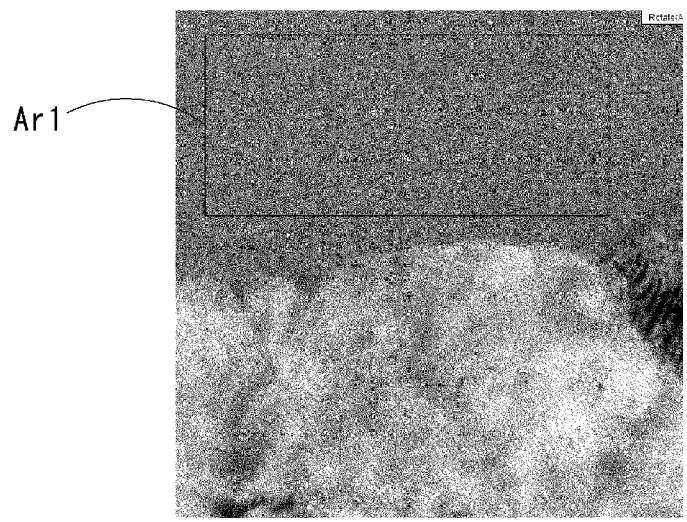
FIG. 5 It is a TEM image showing a cross section of a sample No. 11.
Figure 6:
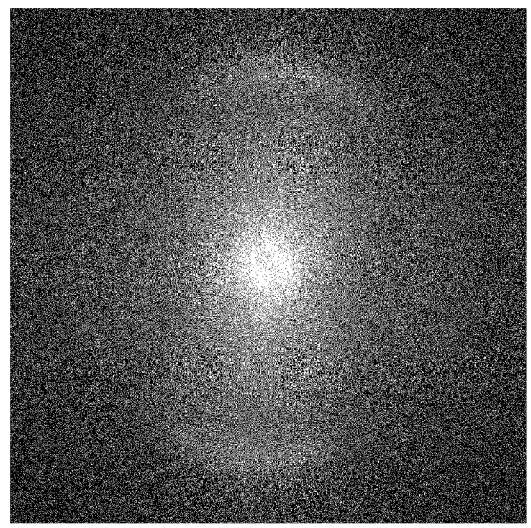
FIG. 6 It is a restricted visual field diffraction image of a nickel layer of the sample No. 11 shown in FIG. 5.

FIG. 5 is a TEM image showing a cross section of the sample No. 11 and FIG. 6 is a restricted visual field diffraction image of the nickel layer of the sample No. 11.

As shown in FIGS. 5 and 6, the sample No. 11 has a layer structure in which the nickel layer (Ni—P alloy), the intermediate layer, and the silver layer are laminated in this order, and accordingly, the contact resistance after the heating is the smallest, the separation between the nickel layer and the silver layer is not observed, and the diffusion of copper was prevented. Among these, in the restricted visual field diffraction image of a region Ar1 surrounded with a square in the image shown in FIG. 5, as shown in FIG. 6, in a case where the structure of the nickel layer is analyzed by the restricted visual field diffraction, a clear diffraction spot was not observed, and accordingly, it is found that the structure is a structure containing an amorphous material.

In contrast, the sample No. 12 does not have the intermediate layer, and accordingly, the contact resistance is great and the separation between the nickel layer and the silver layer was observed. In the sample No. 13, the nickel layer is excessively thin, and accordingly, a barrier effect was not sufficient, the contact resistance was great, and a crack was observed during the bending due to a great thickness of the intermediate layer. In the sample No. 14, the intermediate layer has a small thickness, and accordingly, adhesiveness between the nickel layer and the silver layer is poor, the separation was observed, and a crack was observed during the bending due to an excessive great thickness of the nickel layer.

Figure 7:
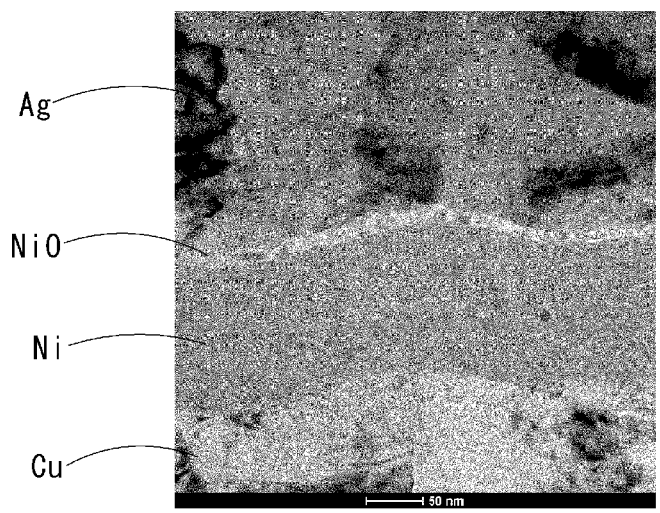
FIG. 7: It is a TEM image showing a cross section after heating a sample No. 15.

FIG. 7 is a TEM image showing a cross section after heating the sample No. 15. As shown in FIG. 7, in a case where the sample No. 15 not including the intermediate layer is heated, a nickel oxide layer (NiO layer) is formed on an interface between the nickel layer and the silver layer. This nickel oxide layer is a high-resistant layer (insulator or high resistor), and accordingly, the contact resistance increases, even in a case where the copper is not diffused to the surface of the silver layer. Therefore, in the sample No. 15, the separation between the nickel layer and the silver layer was observed.

INDUSTRIAL APPLICABILITY

It is possible to efficiently exhibit heat resistance of the silver layer by preventing the diffusion of copper from the base material by the nickel layer provided on the base material formed of copper or a copper alloy, and to increase adhesiveness between the nickel layer and the silver layer and maintain excellent heat resistance by the intermediate layer provided between the nickel layer and the silver layer.

REFERENCE SIGNS LIST

1: Terminal material (terminal material with silver coating film)
2: Base material
3: Nickel layer
4: Intermediate layer
5: Silver layer

The invention claimed is:

1. A terminal material with a silver coating film, comprising:
    a base material formed of copper or a copper alloy; and
    a nickel layer, an intermediate layer, and a silver layer laminated on the base material in this order,
    wherein the nickel layer has a thickness of 0.05 µm to 5.00 µm and is formed of nickel or a nickel alloy,
    the intermediate layer has a thickness of 0.02 µm to 1.00 µm and is an alloy layer containing silver and a substance X, and
    the substance X is selected from any one or more of gallium and germanium.

2. The terminal material with a silver coating film according to claim 1,
    wherein the intermediate layer has a two-layer structure of a first layer containing the substance X as a main component and a second layer containing silver as a main component.

3. The terminal material with a silver coating film according to claim 1,
    wherein the nickel layer contains any one or more of phosphorus, boron, tungsten, sulfur, zinc, and tin in a total content of 1 at % to 40 at %.

4. The terminal material with a silver coating film according to claim 3,
    wherein the nickel layer has a structure containing an amorphous material.

5. A terminal with a silver coating film formed of the terminal material with a silver coating film according to claim 1.

6. The terminal material with a silver coating film according to claim 2,
    wherein the nickel layer contains any one or more of phosphorus, boron, tungsten, sulfur, zinc, and tin in a total content of 1 at % to 40 at %.

7. The terminal material with a silver coating film according to claim 6,
    wherein the nickel layer has a structure containing an amorphous material.

8. A terminal with a silver coating film formed of the terminal material with a silver coating film according to claim 2.

9. A terminal with a silver coating film formed of the terminal material with a silver coating film according to claim 3.

10. A terminal with a silver coating film formed of the terminal material with a silver coating film according to claim 4.

11. A terminal with a silver coating film formed of the terminal material with a silver coating film according to claim 6.

12. A terminal with a silver coating film formed of the terminal material with a silver coating film according to claim 7.

* * * * *